United States Patent
Taylor et al.

(10) Patent No.: US 7,275,192 B2
(45) Date of Patent: Sep. 25, 2007

(54) METHOD AND SYSTEM FOR ON DEMAND SELECTIVE REROUTING OF LOGICAL CIRCUIT DATA IN A DATA NETWORK

(75) Inventors: William Taylor, Duluth, GA (US); David Massengill, Covington, GA (US); John Hollingsworth, Covington, GA (US)

(73) Assignee: AT&T BLS Intellectual Property, Inc., Wilmington, DE (US)

( * ) Notice: Subject to any disclaimer, the term of this patent is extended or adjusted under 35 U.S.C. 154(b) by 296 days.

(21) Appl. No.: 10/829,509

(22) Filed: Apr. 22, 2004

(65) Prior Publication Data

US 2005/0240840 A1  Oct. 27, 2005

(51) Int. Cl.
*G01R 31/28* (2006.01)
*G06F 11/00* (2006.01)
(52) U.S. Cl. .......................................... 714/724; 714/4
(58) Field of Classification Search ................ 714/724, 714/4
See application file for complete search history.

(56) References Cited

U.S. PATENT DOCUMENTS

| | | | |
|---|---|---|---|
| 5,016,244 A | 5/1991 | Massey et al. | |
| 5,559,959 A | 9/1996 | Foglar | |
| 6,185,695 B1 | 2/2001 | Murphy et al. | |
| 6,311,288 B1* | 10/2001 | Heeren et al. | 714/4 |
| 6,581,166 B1 | 6/2003 | Hirst et al. | |
| 6,763,476 B1 | 7/2004 | Dangi et al. | |
| 6,823,477 B1* | 11/2004 | Cheng et al. | 714/26 |
| 6,865,170 B1 | 3/2005 | Zendle | |
| 6,925,578 B2 | 8/2005 | Lam et al. | |
| 7,027,053 B2* | 4/2006 | Berndt et al. | 345/473 |
| 7,093,155 B2 | 8/2006 | Aoki | |
| 2004/0172574 A1 | 9/2004 | Wing et al. | |
| 2005/0135237 A1 | 6/2005 | Taylor et al. | |
| 2005/0135238 A1 | 6/2005 | Taylor et al. | |
| 2005/0135254 A1 | 6/2005 | Taylor et al. | |
| 2005/0135263 A1 | 6/2005 | Taylor et al. | |
| 2005/0138476 A1 | 6/2005 | Taylor et al. | |
| 2005/0172160 A1 | 8/2005 | Taylor et al. | |
| 2005/0172174 A1 | 8/2005 | Taylor et al. | |
| 2006/0146700 A1 | 7/2006 | Taylor et al. | |

OTHER PUBLICATIONS

Official Action dated Oct. 2, 2006, in U.S. Appl. No. 10/744,281 (16 pages).
Official Action dated Jan. 4, 2007, in U.S. Appl. No. 10/348,077 (16 pages).

* cited by examiner

*Primary Examiner*—James C Kerveros
(74) *Attorney, Agent, or Firm*—Merchant & Gould

(57) ABSTRACT

A method and system are provided for on demand selective rerouting of logical circuit data. Upon a failed logical circuit being identified in the data network, one or more alternative logical failover circuits for rerouting data from the identified failed logical circuit is displayed in a menu on a display device. A selection of a logical failover circuit is made using a graphical user interface (GUI). Once the selection of the logical failover circuit is received, the data from the failed logical circuit is rerouted to the selected logical failover circuit. Upon receiving the selection of the logical failover circuit, a determination may be made as to whether a utilization percentage indicate of congestion in the selected logical failover circuit exceeds a predetermined threshold. If the utilization rate exceeds the threshold, then an alert is generated and the selection of an alternative logical failover circuit from the menu is requested.

27 Claims, 8 Drawing Sheets

METHOD AND SYSTEM FOR ON DEMAND SELECTIVE REROUTING OF LOGICAL CIRCUIT DATA IN A DATA NETWORK

CROSS-REFERENCE TO RELATED APPLICATIONS

The present application is related to U.S. patent application Ser. No. 10/348,077, entitled "Method and System for Obtaining Logical Performance Data for a Circuit in a Data Network," filed on Jan. 21, 2003, and U.S. patent application Ser. No. 10/348,592, entitled "Method and System for Provisioning and Maintaining a Circuit in a Data Network," filed on Jan. 21, 2003. This application is also related to U.S. patent application Ser. No. 10/745,117, entitled "Method And System For Providing A Failover Circuit For Rerouting Logical Circuit Data In A Data Network," filed on Dec. 23, 2003, U.S. patent application Ser. No. 10/745,170, entitled "Method And System For Automatically Identifying A Logical Circuit Failure In A Data Network," filed on Dec. 23, 2003, U.S. patent application Ser. No. 10/744,921, entitled "Method And System For Automatically Rerouting Logical Circuit Data In A Data Network," filed on Dec. 23, 2003. All of the above-referenced applications are assigned to the same assignee as the present application and are expressly incorporated herein by reference.

TECHNICAL FIELD

The present invention relates to the routing of data using logical circuits in a data network. More particularly, the present invention is related to on demand rerouting of logical circuit data in a data network.

BACKGROUND OF THE INVENTION

Data networks contain various network devices, such as switches, for sending and receiving data between two locations. For example, frame relay and Asynchronous Transfer Mode ("ATM") networks contain interconnected network devices that allow data packets or cells to be channeled over a circuit through the network from a host device to a remote device. For a given network circuit, the data from a host device is delivered to the network through a physical circuit such as a T1 line that links to a switch of the network. The remote device that communicates with the host through the network also has a physical circuit to a switch of the network. A network circuit also includes a logical circuit which includes a variable communication path for data between the switches associated with the host and the remote device.

In large-scale networks, the host and remote end devices of a network circuit may be connected across different local access and transport areas ("LATAs") which may be in turn be connected to one or more Inter-Exchange Carriers ("IEC") for transporting data between the LATAs. These connections are made through physical trunk circuits utilizing fixed logical connections known as Network-to-Network Interfaces ("NNIs").

Periodically, failures may occur to the trunk circuits or the NNIs of network circuits in large-scale networks causing lost data. Currently, such network circuit failures are handled by dispatching technicians on each end of the network circuit (i.e., in each LATA) in response to a reported failure. The technicians manually access a logical element module to troubleshoot the logical circuit portion of the network circuit. The logical element module communicates with the switches in the data network and provides the technician with the status of the logical connections which make up the logical circuit. Once the technician determines the status of a logical connection at one end of a logical circuit (e.g., the host end), the technician then must access a network database to determine the location of the other end of the logical circuit so that its status may also be ascertained. If the technician determines the logical circuit is operating properly, the technician then accesses a physical element module to troubleshoot the physical circuit portion of the network circuit to determine the cause of the failure and then repair it.

Current methods of repairing network circuit failures, however, suffer from several drawbacks. One drawback is that repairing logical and physical circuits is time consuming, resulting in dropped data packets or cells until the repair is completed. If a technician determines that a network circuit will be "down" (i.e., losing data) for an extended time period while troubleshooting a network circuit, the technician may manually reroute the data from a failed network circuit to an available unused or "backup" network circuit while the failed network circuit is being repaired. For example, troubleshooting a physical circuit often requires taking the network circuit out of service to perform testing, thus increasing the downtime and loss of data in the network circuit. These backup network circuits, however, are often limited in capacity and thus may not be able to reroute all of the data from one or more failed network circuits. Furthermore, network circuit customers have no control over which logical circuit data is to be rerouted or when a technician will decide to initiate a reroute. It is with respect to these considerations and others that the present invention has been made.

SUMMARY OF THE INVENTION

In accordance with the present invention, the above and other problems are solved by a method and system for on demand selective rerouting of logical circuit data in a data network. When a logical circuit failure is detected, a list of alternative or logical failover circuits is generated for rerouting the data from the failed logical circuit. Upon the selection of a logical failover circuit, the data from the failed logical circuit is rerouted to the selected logical failover circuit in the data network.

According to the method, a failed logical circuit is identified in the data network. The method further includes displaying one or more logical failover circuits for rerouting data from the identified failed logical circuit, receiving a selection of a logical failover circuit, and rerouting the data from the failed logical circuit to the selected logical failover circuit. In displaying the one or more logical failover circuits, a menu may be generated which lists each logical failover circuit.

The method may further include, after receiving a selection of a logical failover circuit from the menu, determining whether a utilization of the selected logical failover circuit exceeds a threshold. If the utilization is less than the threshold, then the method includes rerouting the logical circuit data from the failed logical circuit to the selected logical failover circuit. If the utilization rate exceeds the threshold, then the method includes requesting the selection of an alternative logical failover circuit from the menu. The logical failover circuit may include a dedicated failover logical connection in a failover data network. The logical circuit and the logical failover circuit may be identified by logical circuit identifiers. The logical circuit identifiers may be data link connection identifiers ("DLCIs") or virtual path/virtual circuit identifiers ("VPI/VCIs"). The dedicated failover logical connection may be a network-to-network interface ("NNI"). The logical failover circuit may be either a permanent virtual circuit ("PVC") or a switched virtual circuit ("SVC"). The data network may be either frame relay network or an asynchronous transfer mode ("ATM") network.

In accordance with other aspects, the present invention relates to a system for on demand selective rerouting of logical circuit data in a data network. The system includes a network device for communicating status information for a logical circuit in the data network. The status information may include trap data generated by the network device and indicates the status of one or more logical connections making up the logical circuit. The logical circuit defines a communication path for communicating data. The system also includes a logical element module, in communication with the network device, for receiving the status information for the logical circuit in the data network. The system further includes a network management module, in communication with the logical element module, for identifying a failure in the logical circuit based on the status information. Upon identifying the failed logical circuit, the network management module generates a menu displaying one or more logical failover circuits for rerouting data from the failed logical circuit, receives a selection of a logical failover circuit displayed in the menu, and reroutes the data from the failed logical circuit to the selected logical failover circuit.

The network management module may be further operative to, after receiving a selection of a logical failover circuit from the menu, determine whether a utilization of the selected logical failover circuit exceeds a threshold. If the utilization is less than the threshold, the network management module is operative to reroute the logical circuit data from the failed logical circuit to the selected logical failover circuit. If the utilization exceeds the threshold, the network management module is operative to request the selection of an alternative logical failover circuit from the menu.

In accordance with still other aspects, the present invention relates to a computer system having a graphical user interface including a display and a user interface selection device. The computer system is operative to perform a method of providing and selecting from a menu on the display one or more logical failover circuits for rerouting data from a failed logical circuit in a data network. The method includes displaying a failed logical circuit on a map on the display. The map includes a current status of the one or more logical circuits in the data network. The method further includes receiving a map entry selection signal indicative of the user interface selection device pointing at the map on the display, and, in response to the selection signal, displaying the menu. The menu includes one or more entries including a logical failover circuit for rerouting the data from the displayed failed logical circuit. The method further includes receiving an execution signal indicative of a user selecting the menu entry comprising the selected logical failover circuit, and in response to the execution signal, rerouting the data from the failed logical circuit to the selected logical failover circuit.

These and various other features as well as advantages, which characterize the present invention, will be apparent from a reading of the following detailed description and a review of the associated drawings.

DETAILED DESCRIPTION OF THE INVENTION

Embodiments of the present invention provide for a method and system for on demand selective rerouting of logical circuit data in a data network. In accordance with the present invention, the above and other problems are solved by a method and system for on demand selective rerouting of logical circuit data in a data network. When a logical circuit failure is detected, a list of alternative or logical failover circuits is generated for rerouting the data from the failed logical circuit. Upon the selection of a logical failover circuit, the data from the failed logical circuit is rerouted to the selected logical failover circuit in the data network.

Figure 1:
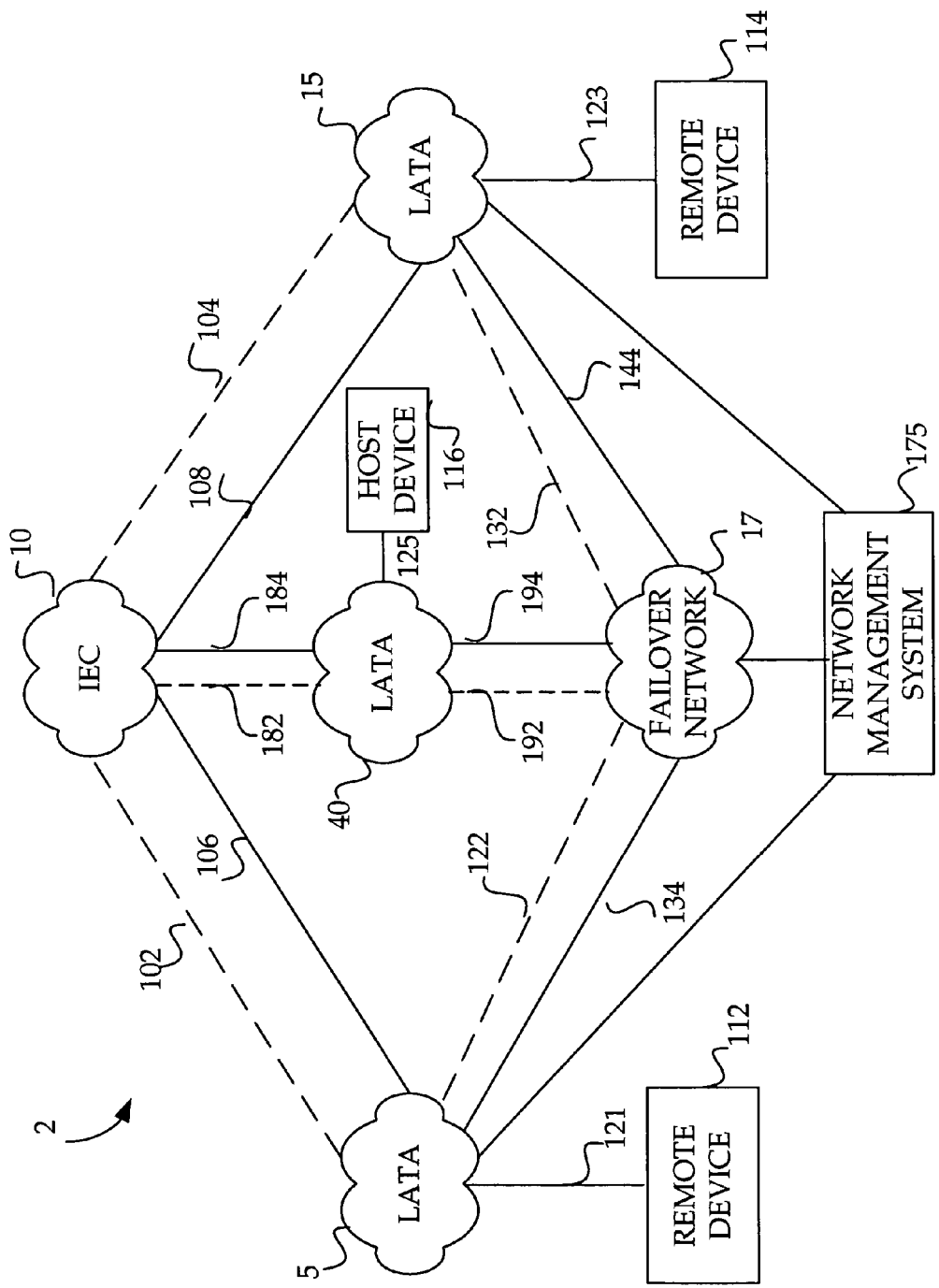
FIG. 1 illustrates a data network according to an embodiment of the invention.

Embodiments of the present invention may be generally employed in a data network 2 as shown in FIG. 1. The data network 2 includes local access and transport areas ("LATAs") 5 15, and 40 which are connected by an Inter-Exchange Carrier ("IEC") 10. It should be understood that the LATAs 5, 15, and 40 may be data networks operated by a commonly owned Local Exchange Carrier ("LEC"). It should be further understood that the IEC 10 may include one or more data networks which may be operated by a commonly owned IEC. It will be appreciated by those skilled in the art that the data network 2 may be a frame relay network, asynchronous transfer mode ("ATM") network, or any other network capable of communicating data conforming to Layers 2–4 of the Open Systems Interconnection ("OSI") model developed by the International Standards Organization, incorporated herein by reference. It will be appreciated that these networks may include, but are not limited to, communications protocols conforming to the Multiprotocol Label Switching Standard ("MPLS") networks and the Transmission Control Protocol/Internet Protocol ("TCP/IP"), which are known to those skilled in the art.

The data network 2 includes multiple network circuits which communicate data between a host device 116 and remote devices 112 and 114 through the LATAs 5, 15, 40 and the IEC 10. It will be appreciated by those skilled in the art that the host and remote devices 112, 114, and 116 may be local area network ("LAN") routers, LAN bridges, hosts, front end processors, Frame Relay Access Devices ("FRADs"), or any other device with a frame relay, ATM, or network interface. It will be further appreciated that in the data network 2, the LATAs 5, 15, 40 and the IEC 10 may include network elements (not shown) which support interworking to enable communications between host and remote devices supporting dissimilar protocols. Network elements in a data network supporting interworking may translate frame relay data packets or frames sent from a host FRAD to ATM data packets or cells so that a host device may communicate with a remote device having an ATM interface. The LATAs 5, 15, 40 and the IEC 10 may further include one or more interconnected network elements, such as switches (not shown), for transmitting data. An illustrative LEC data network will be discussed in greater detail in the description of FIG. 2 below.

Each network circuit between the host device 116 and the remote devices 112 and 114 in the data network 2 includes a physical circuit and a logical circuit. As used in the foregoing description and the appended claims, a physical circuit is defined as the physical path that connects the end point of a network circuit to a network device. For example, the physical circuit of the network circuit between the host device 116 and the remote device 112 includes the physical connection 125 between the host device 116 and the LATA 40, the physical connection 182 between the LATA 40 and the IEC 10, the physical connection 106 between the IEC 10 and the LATA 5, and the physical connection 121 between the LATA 5 and the remote device 112. Routers and switches within the LATAs 5, 15, 40 and the IEC 10 carry the physical signal between the host and remote end devices 116, 112, and 114 through each physical circuit.

It should be understood that the host and remote devices may be connected to a physical circuit, such as the one described above, using user-to-network interfaces ("UNIs"). As is known to those skilled in the art, an UNI is the physical demarcation point between a user device (e.g, a host device) and a public data network. It will further be understood by those skilled in the art that the physical connections 106, 108, and 184 may include trunk circuits for carrying the data between the LATAs 5, 15, 40 and the IEC 10. It will be further understood by those skilled in the art that the connections 121, 123, and 125 may be any of various physical communications media for communicating data such as a 56 Kbps line or a T1 line carried over a four-wire shielded cable or over a fiber optic cable.

As used in the foregoing description and the appended claims, a logical circuit is defined as a portion of the network circuit wherein data is sent over variable communication data paths or logical connections (shown as dotted lines in the data network 2) established between the first and last network devices within a LATA or IEC network and over fixed communication data paths or logical connections between LATAs (or between IECs). Thus, no matter what path the data takes within each LATA or IEC, the beginning and end of each logical connection between networks will not change. For example, the logical circuit of the network circuit in the data network 2 between the host device 116 and the remote device 112 may include a variable communication path within the LATA 40 and a fixed communication path (i.e., the logical connection 182) between the LATA 40 and the IEC 10. It will be understood by those skilled in the art that the logical connections 102, 104, 182, 122, and 132 in the data network 2 may include network-to-network interfaces ("NNIs") between the last sending switch in a LATA and the first receiving switch in an IEC. It should be understood that in data networks supporting interworking (i.e., utilizing both frame relay and ATM devices), data may be communicated over frame relay circuits over the UNI connections between the host or remote device and the LATA (or IEC) data network, and over ATM circuits over the NNI connections within the LATA (or IEC) data network.

As is known to those skilled in the art, each logical circuit in a data network may be identified by a unique logical identifier. In frame relay networks, the logical identifier is called a Data Link Connection Identifier ("DLCI") while in ATM networks the logical identifier is called a Virtual Path Identifier/Virtual Circuit Identifier ("VPI/VCI"). In frame relay networks, the DLCI is a 10-bit address field contained in the header of each data frame and contains identifying information for the logical circuit as well as information relating to the destination of the data in the frame, quality of service ("QoS") parameters, and other service parameters for handling network congestion. For example, in the data network 2 implemented as a frame relay network, the designation DLCI 100 may be used to identify the logical circuit between the host device 116 and the remote device 112. It will be appreciated that in data networks in which logical circuit data is communicated through more than one carrier (e.g., an LEC and an IEC) the DLCI designation for the logical circuit may change in a specific carrier's network. For example, in the data network 2, the designation DLCI 100 may identify the logical circuit in the LATAs 40 and 5 but the designation DLCI 800 may identify the logical circuit in the IEC 10.

Illustrative service parameters which may be included in the DLCI include a Committed Information Rate ("CIR") parameter and a Committed Burst Size ("Bc") parameter. As is known to those skilled in the art, the CIR represents the average capacity of the logical circuit and the Bc represents the maximum amount of data that may be transmitted. It will be appreciated that the logical circuit may be provisioned such that when the CIR or the Bc is exceeded, the receiving switch in the data network will discard the frame. It should be understood that the logical circuit parameters are not limited to CIR and Bc and that other parameters known to those skilled in the art may also be provisioned, including, but not limited to, Burst Excess Size ("Be") and Committed Rate Measurement Interval ("Tc"). In ATM networks, the VPI/VCI is an address field contained in the header of each ATM data cell and contains identifying information for the logical circuit as well as information specifying a data cell's destination, QoS parameters, and specific bits which may indicate, for example, the existence of congestion in the network and a threshold for discarding cells.

It should be understood that each logical circuit in the data network 2 may be a permanent virtual circuit ("PVC") available to the network at all times or a temporary or a switched virtual circuit ("SVC") available to the network only as long as data is being transmitted. It should be understood that the data network 2 may further include additional switches or other interconnected network elements (not shown) creating multiple paths within each LATA and IEC for defining each PVC or SVC in the data network. It will be appreciated, for example, that the data communicated over the logical connections 182 and 102 may be physically carried by the physical connections 184 and 106.

The data network 2 may also include a failover network 17 for rerouting logical circuit data, according to an embodiment of the invention. The failover network 17 may include multiple network failover circuits. For example, one network failover circuit may include physical connections 134 and 144 and logical connections 122 and 132 for rerouting logical circuit data in the event of a failure in the network circuit between the remote device 112 and the remote device 114. The failover network 17 will be described in greater detail in the description of FIG. 4 below. The data network 2 may also include a network management system 175 in communication with the LATAs 5, 15, 40 and the failover network 17. The network management system 175 may be utilized to obtain status information for the logical and physical circuits between the host device 116 and the remote devices 112 and 114. The network management system 175 may also be utilized for rerouting logical data in the data network 2 between the host device 116 and the remote devices 112 and 114. The network management system 175 will be discussed in greater detail in the description of FIG. 3 below.

Figure 2:
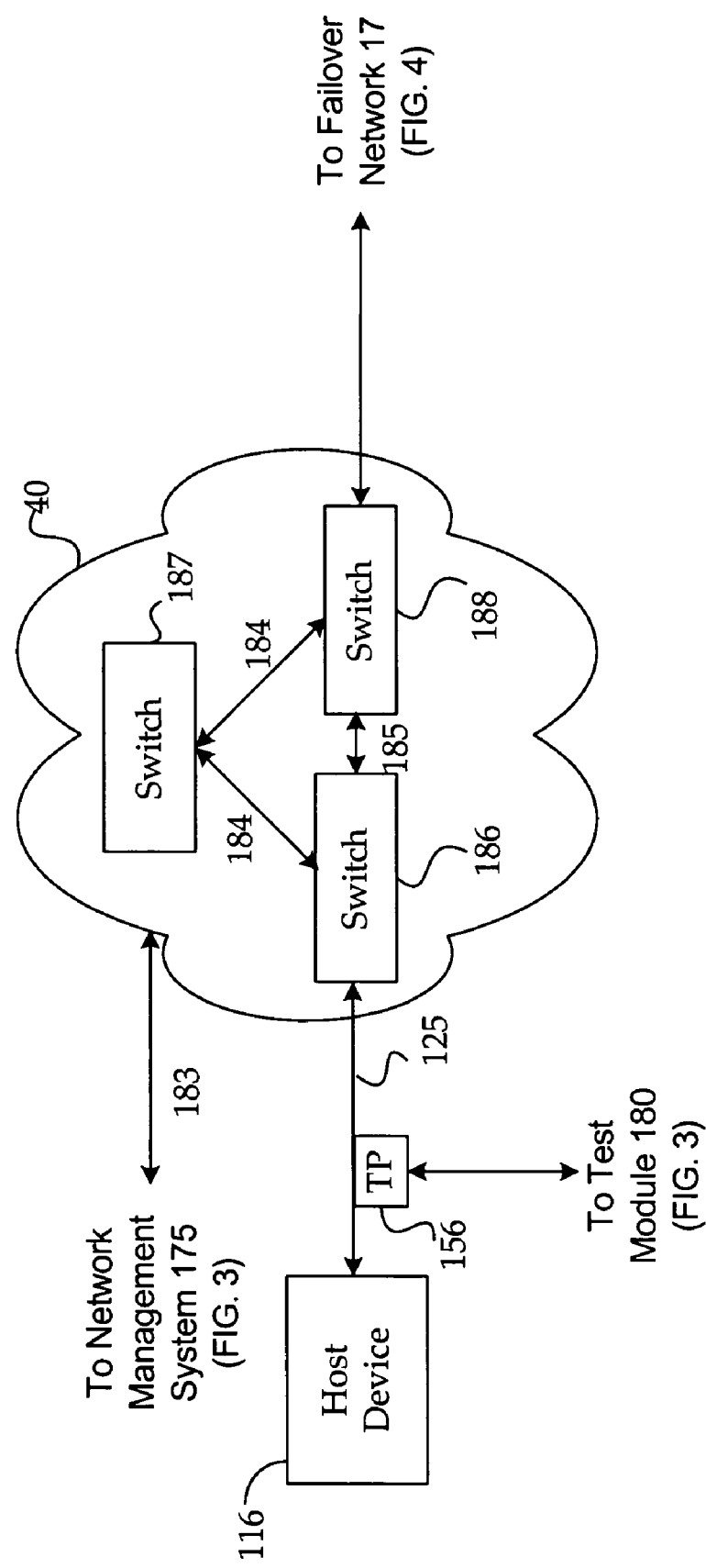
FIG. 2 illustrates a local access and transport area ("LATA") in the data network of FIG. 1, according to an embodiment of the invention.

FIG. 2 illustrates the LATA 40 in the data network 2 described in FIG. 1 above, according to an embodiment of the present invention. As shown in FIG. 2, the LATA 40 includes interconnected network devices such as switches 186, 187, and 188. It will be appreciated that the data network 2 may also contain other interconnected network devices and elements (not shown) such as digital access and cross connect switches ("DACS"), channel service units ("CSUs"), and data service units ("DSUs"). As discussed above in the description of FIG. 1, the connection data paths of a logical circuit within a data network may vary between the first and last network devices in a data network. For example, as shown in FIG. 2, the logical circuit in the LATA 40 may include the communication path 185 between the switches 186 and 188 or the communication path 184 between the switches 186, 187, and 188. As discussed above, it should be understood that the actual path taken by data through the LATA 40 is not fixed and may vary from time to time, such as when automatic rerouting takes place.

It will be appreciated that the switches 186, 187, and 188 may include a signaling mechanism for monitoring and signaling the status of the logical circuit in the data network 2. Each time a change in the status of the logical circuit is detected (e.g., a receiving switch begins dropping frames), the switch generates an alarm or "trap" which may then be communicated to a management station, such as a logical element module (described in detail in the description of FIG. 3 below), in the network management system 175. The trap may include, for example, status information indicating network congestion (i.e., dropped packets or cells).

In one embodiment, the signaling mechanism may be in accord with a Local Management Interface ("LMI") specification, which provides for the sending and receiving of "status inquiries" between a data network and a host or remote device. The LMI specification includes obtaining status information through the use of special management frames (in frame relay networks) or cells (in ATM networks). In frame relay networks, for example, the special management frames monitor the status of logical connections and provide information regarding the health of the network. In the data network 2, the host and remote devices 116, 112, and 114 receive status information from the switches in the individual LATAs they are connected to in response to a status request sent in a special management frame or cell. The LMI status information may include, for example, whether or not a logical circuit has failed. It should be understood that the parameters and the signaling mechanism discussed above are optional and that other parameters and mechanisms may also be utilized to obtain connection status information for a logical circuit.

Figure 3:
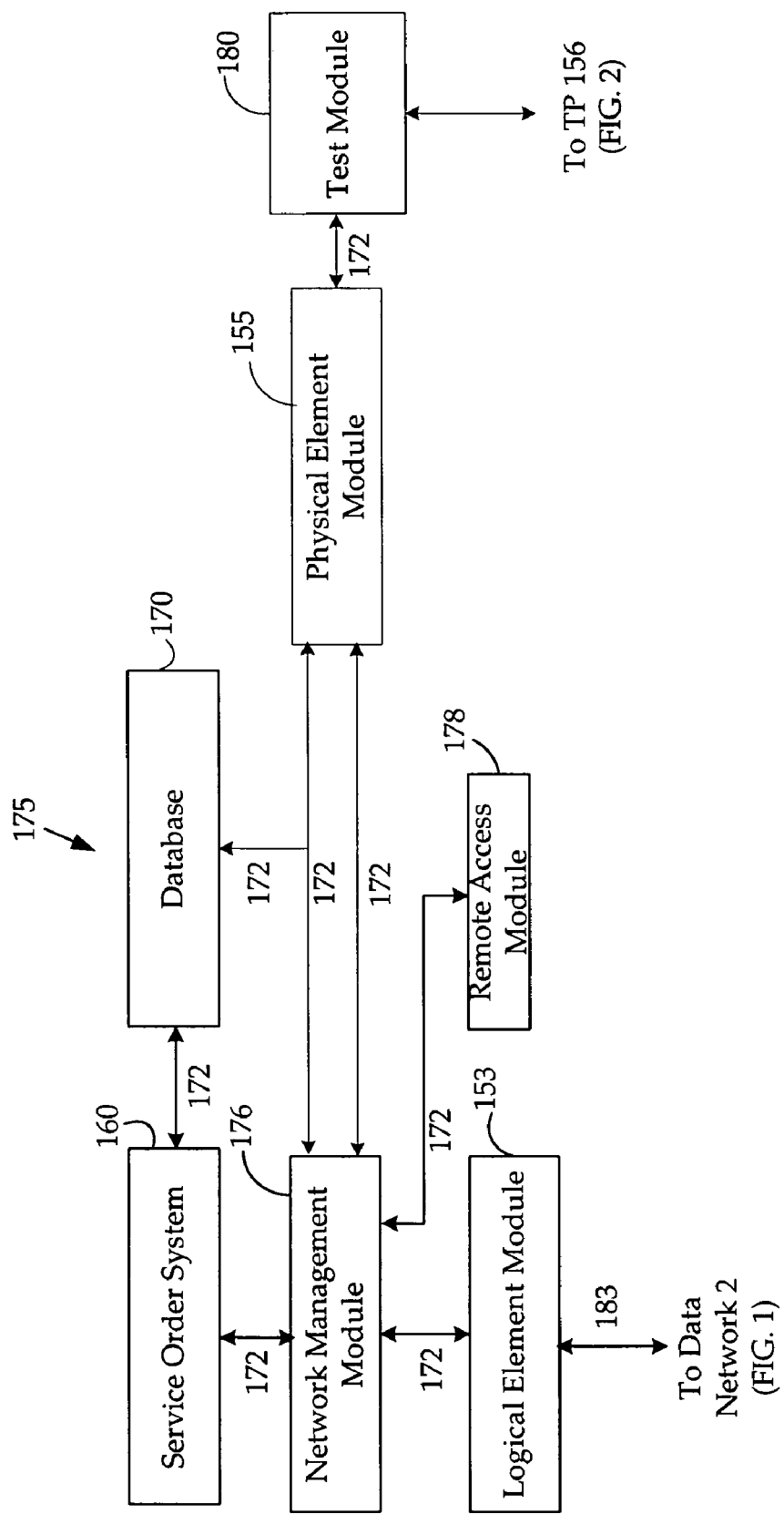
FIG. 3 illustrates a network management system which may be utilized for on demand selective rerouting of logical circuit data in the data network of FIG. 1, according to an embodiment of the invention.

FIG. 3 illustrates the network management system 175 which may be utilized for prioritized rerouting of logical circuit data in the data network of FIG. 1, according to an embodiment of the invention. The network management system 175 includes a service order system 160, a network database 170, a logical element module 153, a physical element module 155, a network management module 176, a remote access module 178, and a test module 180. The service order system 160 is utilized in the data network 2 for receiving service orders for provisioning network circuits. The service order includes information defining the transmission characteristics or QoS parameters for the logical circuit portion of the network circuit. The service order also contains the access speed, CIR, burst rates, and excess burst rates. The service order system 160 communicates the service order information to a network database 170 over management trunk 172. The network database 170 assigns and stores the parameters for the physical circuit portion of the network circuit such as a port number on the switch 186 for transmitting data over the physical connection 121 to and from the host device 112.

The network database 170 may also be in communication with an operations support system (not shown) for assigning physical equipment to the network circuit and for maintaining an inventory of the physical assignments for the network circuit. An illustrative operations support system is "TIRKS"® (Trunks Integrated Records Keeping System) marketed by TELECORDIA™ TECHNOLOGIES, Inc. of Morristown, N.J. The network database 170 may also be in communication with a Work Force Administration and Control system ("WFA/C") (not shown) used to assign resources (i.e., technicians) to work on installing the physical circuit.

The network management system 175 also includes the logical element module 153 which is in communication with the switches in the data network 2 through management trunks 183. The logical element module 153 runs a network management application program to monitor the operation of logical circuits which includes receiving trap data generated by the switches with indicate the status of logical connections. The trap data may be stored in the logical element module 153 for later analysis and review. The logical element module 153 is also in communication with the network database 170 via management trunks 172 for accessing information regarding logical circuits such as the logical identifier data. The logical identifier data may include, for example, the DLCI or VPI/VCI header information for each data frame or cell in the logical circuit including the circuit's destination and QoS parameters. The logical element module 153 may consist of terminals (not shown) that display a map-based graphical user interface ("GUI") of the logical connections in the data network. An illustrative logical element module is the NAVISCORE™ system marketed by LUCENT TECHNOLOGIES, Inc. of Murray Hill, N.J.

The network management system 175 further includes the physical element module 155 in communication with the physical connections of the network circuit via management trunks (not shown). The physical element module 155 runs a network management application program to monitor the operation and retrieve data regarding the operation of the physical circuit. The physical element module 155 is also in communication with the network database 170 via management trunks 172 for accessing information regarding physical circuits, such as line speed. Similar to the logical element module 153, the physical logical element module 155 may also consist of terminals (not shown) that display a map-based GUI of the physical connections in the LATA 5. An illustrative physical element module is the Integrated Testing and Analysis System ("INTAS"), marketed by TELECORDIA™ TECHNOLOGIES, Inc. of Morristown, N.J., which provides flow-through testing and analysis of telephony services.

The physical element module 155 troubleshoots the physical connections for a physical circuit by communicating with test module 180, which interfaces with the physical connections via test access point 156. The test module 180 obtains the status of the physical circuit by transmitting "clean" test signals to test access point 156 (shown in FIG. 2) which "loops back" the signals for detection by the test module 180. It should be understood that there may multiple test access points on each of the physical connections for the physical circuit.

The network management system 175 further includes the network management module 176 which is in communication with the service order system 160, the network database 170, the logical element module 153, and the physical element module 155 through communications channels 172. It should be understood that in one embodiment, the network management system 176 may also be in communication with the LATA 15, the IEC 10, and the failover network 17. The communications channels 172 may be on a LAN. The network management module 176 may consist of terminals (not shown), which may be part of a general-purpose computer system that displays a map-based GUI of the logical connections in data networks. In one embodiment, the network management module 176 may also display remote the logical circuits between the end devices (i.e., host and remote devices) in the data network 2. The network management module 176 may communicate with the logical element module 153 and the physical element module 155 using a Common Object Request Broker Architecture ("CORBA"). As is known to those skilled in the art, CORBA is an open, vendor-independent architecture and infrastructure which allows different computer applications to work together over one or more networks using a basic set of commands and responses.

The network management module 176 may also serve as an interface for implementing logical operations to provision and maintain network circuits. The logical operations may be implemented as machine instructions stored locally or as instructions retrieved from the logical and physical element modules 153 and 155. An illustrative method detailing the provisioning and maintenance of network circuits in a data network is presented in U.S. patent application Ser. No. 10/348,592, entitled "Method And System For Provisioning And Maintaining A Circuit In A Data Network," filed on Jan. 23, 2003, and assigned to the same assignee as this application, which is expressly incorporated herein by reference. An illustrative network management module is the Broadband Network Management System® ("BBNMS") marketed by TELECORDIA™ TECHNOLOGIES, Inc. of Morristown, N.J. The network management module 176 will be will be discussed in greater detail in the description of FIG. 5 below.

The network management module 176 may also serve as an interface with the logical element module 153 to receive and store trap data indicating the status of the logical connections comprising logical circuits in the data network 2. It will be appreciated that the network management module 176 may further be configured to compile historical statistics for logical circuits based on an analysis of stored trap data. These historical statistics may include, for example, the utilization of logical circuits (i.e., the extent to which logical circuits are being used) in the data network 2. It will be appreciated that utilization may be represented as a percentage corresponding to logical circuit usage at a given point in time or over a period of time. For example, if a logical circuit supports a T-1 data transmission rate (i.e., 1.544 megabits per second) but, on average, is used to support a data transmission rate of 772 kilobits per second), the logical circuit is only 50% utilized. It will be appreciated that logical circuits with utilizations approaching 100% may suffer congestion some percentage of the time. This may occur, for example, when the maximum data transmission rate (e.g., the Committed Burst Size or Bc) for a logical circuit is maintained over an extended period of time.

The network management system 176 further includes the remote access module 178 which is in communication with the network management module 176 through communications channels 172. It will be appreciated that the remote access module 178 may communicate with the network management module 176 over a LAN. The remote access module 178 may include a general-purpose computer system for sending and receiving commands and data from the network management module 176. In one embodiment, the remote access module may display the map-based GUI similar to that displayed by the network management module 176 showing the logical circuits between the end devices (i.e., host and remote devices) in the data network 2. An illustrative display of a map displaying logical circuits in the data network 2 on the remote access module 178 (or the network management module 176) will be discussed in greater detail in the description of FIG. 6 below.

Figure 4:
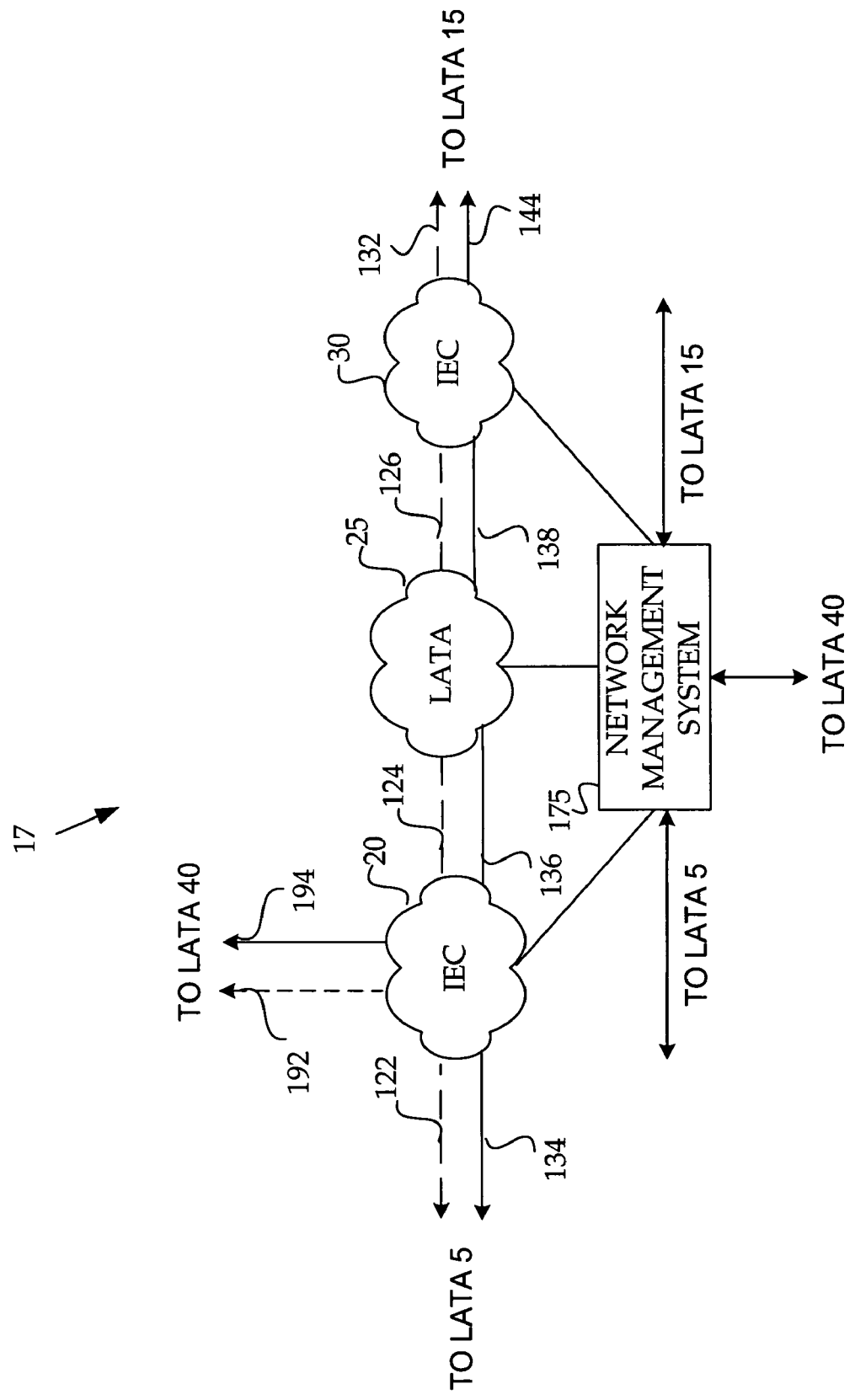
FIG. 4 illustrates a failover data network for rerouting logical circuit data, according to an embodiment of the invention.

FIG. 4 shows an illustrative failover data network for rerouting logical circuit data, according to one embodiment of the present invention. As shown in FIG. 4, the failover network 17 includes an IEC 20, a LATA 25, and an IEC 30. The failover network further includes network failover circuits for rerouting data. Each network failover circuit in the failover network 17 includes a physical failover circuit and a logical failover circuit. For example, one network circuit in the failover network 17 includes the physical failover circuit comprising the physical connection 134 between the LATA 5 (shown in FIG. 1) and the IEC 20, the physical connection 136 between the IEC 20 and the LATA 25, the physical connection 138 between the LATA 25 and the IEC 30, and the physical connection 144 between the IEC 30 and the LATA 15 (shown in FIG. 1). The corresponding logical circuit includes the logical connection 122 between the LATA 5 (shown in FIG. 1) and the IEC 20, the logical connection 124 between the IEC 20 and the LATA 25, the logical connection 126 between the LATA 25 and the IEC 30, and the logical connection 132 between the IEC 30 and the LATA 15 (shown in FIG. 1). Similarly, a second network failover circuit in the failover network 17 includes the physical failover circuit comprising the physical connection 134 between the LATA 5 (shown in FIG. 1) and the IEC 20, and the physical connection 194 between the IEC 20 and the LATA 40 (shown in FIG. 1). It should be understood that in one embodiment, the network failover circuits illustrated in the failover network 17 may each include a dedicated physical circuit and a dedicated logical circuit provisioned by a network service provider serving the LATAs 5, 15, 25, and 40 as well as the IECs 20 and 30, for rerouting logical data from a failed logical circuit.

Figure 5:
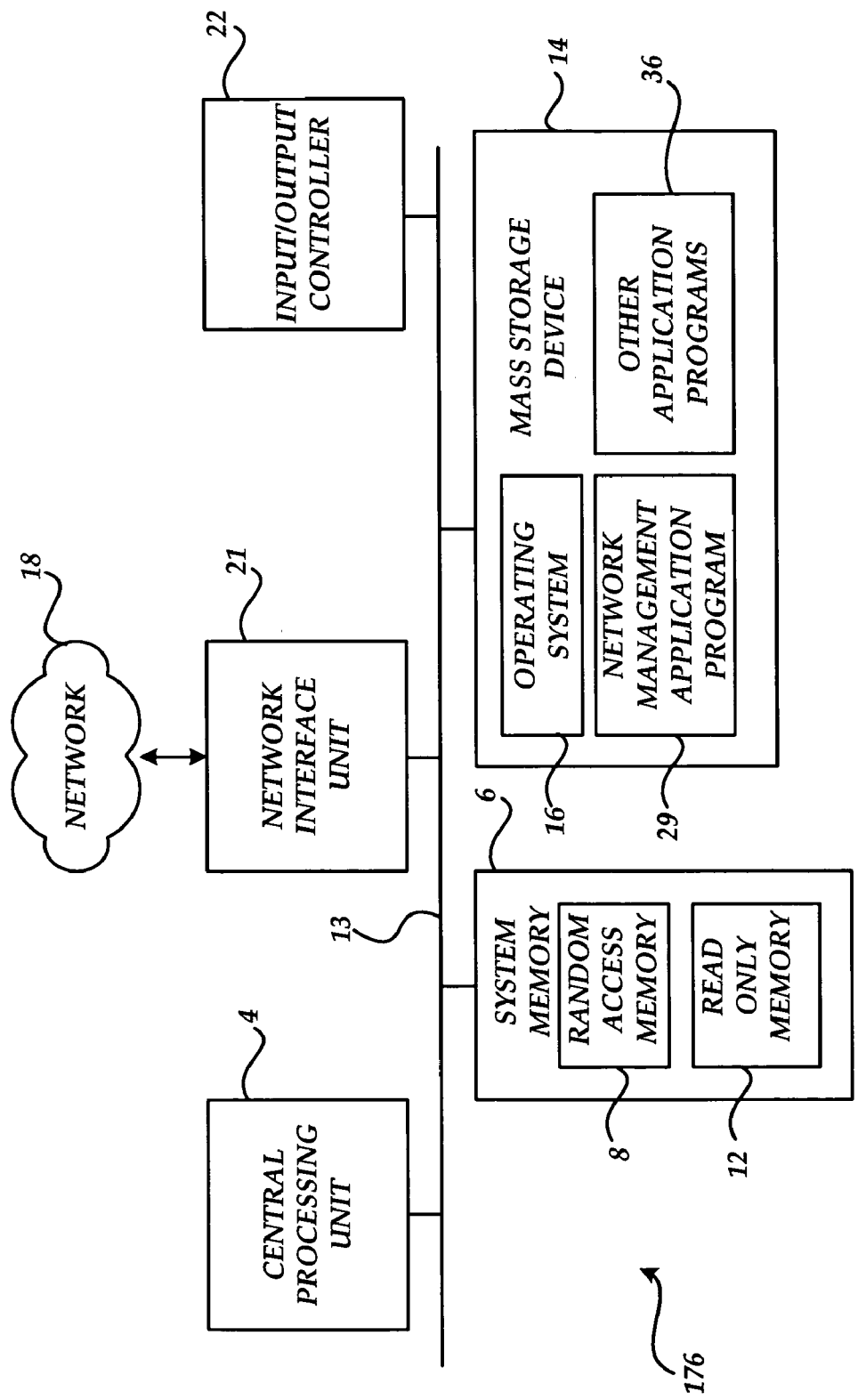
FIG. 5 shows an illustrative computer architecture for the network management module in the network management system of FIG. 3, according to an embodiment of the invention.

FIG. 5 shows an illustrative computer architecture for the network management module 176 described above with respect to FIG. 3. It should be understood that the remote access module 178 (also described above with respect to FIG. 3) may include many or all of the elements described below relative to the network management module 176. As briefly discussed in FIG. 3, the network management module 176 may include a general-purpose computer system such as a standard local or server computer operative to execute one or more application programs, such as network management application program 29. As will be described in greater detail below the update utility 29 updates the contents of the memory devices 11 and 12. Alternatively, the computer system 2 may include another type of computing device operative to access a network 18, such as a personal digital assistant or other type of computer. The computer architecture shown in FIG. 5 illustrates a conventional personal computer, including a central processing unit 4 ("CPU"), a system memory 6, including a random access memory 8 ("RAM") and a read-only memory ("ROM") 12, and a system bus 13 that couples the system memory 6 to the CPU 4.

The network management module 176 further includes a mass storage device 14 for storing an operating system 16, the network management application program 29, and other application programs 36. The mass storage device 14 is connected to the CPU 4 through a mass storage controller (not shown) connected to the bus 13. The mass storage device 14 and its associated computer-readable media, provide non-volatile storage for the network management module 176. Although the description of computer-readable media contained herein refers to a mass storage device, such as a hard disk or CD-ROM drive, it should be appreciated by those skilled in the art that computer-readable media can be any available media that can be accessed by a computer system.

The network management module 176 may also include an input/output controller 22 for receiving and processing input from a number of devices, including a keyboard, mouse, or electronic stylus (not shown in FIG. 1). Similarly, an input/output controller 22 may provide output to a display screen, a printer, or other type of output device.

As discussed briefly above, the mass storage device 14 stores the network management application program 29 which includes computer code for enabling the functionality of the network management module 176 and for communicating with the logical element module 153, the physical element module 155, and the remote access module 178. As discussed above, the network management module 176 displays a map-based GUI of the logical connections in data networks. The network management module 176 may also be utilized for identifying logical circuit failures in the data network 2 and rerouting data from failed logical circuits.

The network management module 176 may operate in a networked environment using logical connections to one or more remote computers (such as the remote access module 178) through the network 18. The network management module 176 may connect to the network 18 through a network interface unit 21 connected to the bus 13. The network 18 may include a LAN as well as a wide area network (WAN) which may include the Internet. The Internet is well known to those skilled in the art as essentially a packet-switched network based on the family of protocols called Transmission Control Protocol/Internet Protocol (TCP/IP), a family of networking protocols providing communication across interconnected networks between computers with diverse hardware architectures and between various computer operating systems. Operation of the Internet and the TCP/IP transmission protocols is well known to those skilled in the art.

The network management module 176 may serve as an Internet web server for maintaining and administering Internet web pages serving as an access point to the functionality of the present invention via the remote access module 178. For example, a network circuit customer located in the LATA 40 may use the remote access module 178 to view the status of logical circuits or enter commands to instruct the network management module to reroute logical circuit data in the data network 2 by accessing one or more Internet web pages maintained at the network management module 176 and operated by a network service provider.

Figure 6:
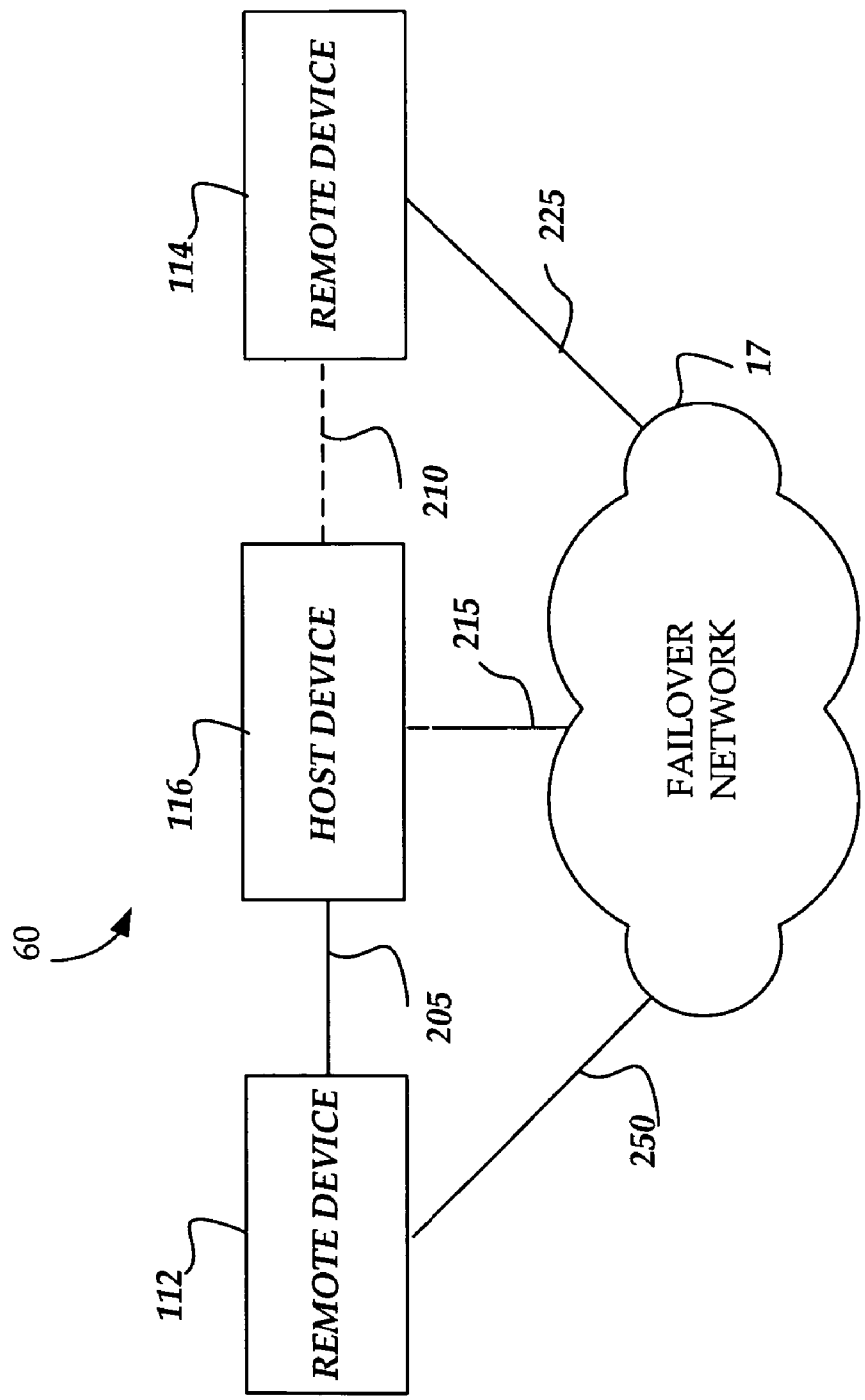
FIG. 6 shows an illustrative display of a map displaying logical circuits in the data network of FIG. 1 which may be generated by the network management module of FIG. 5, according to an embodiment of the invention.

FIG. 6 shows an illustrative display of a map 60 displaying logical circuits in the data network 2 which may be generated by the network management module 176 or the remote access module 178 discussed above with respect to FIGS. 3 and 5. The map 60 graphically displays the status of the logical circuits 205 and 210 between the host device 116 and the remote devices 112 and 114 in the data network 2. Failed logical circuits may be displayed differently on the map 60 to distinguish them from working logical circuits. For example, logical circuit 210 is displayed as a dashed line on the map 60 to indicate a logical circuit failure while working logical circuit 205 is displayed as a solid line. Additionally, logical failover circuits 215, 225, and 250 connecting the network devices 112, 114, and 116 to the failover network 17 are also displayed as solid lines to indicate that these circuits are working. It will be appreciated that the status of the logical circuits and the logical failover circuits on the map 60 may also be displayed using a predetermined color scheme. For example, working logical circuits may be displayed on the map 60 in green while failed logical circuits may be shown in red. It will further be appreciated that in an alternative embodiment of the invention, the aforementioned status indicators may be applied to the boxes representing the network devices on the map 60. For example, the remote device 114 may be displayed in red to indicate that the remote device 114 is not receiving data from a logical circuit in communication with the host device 116.

Figure 7:
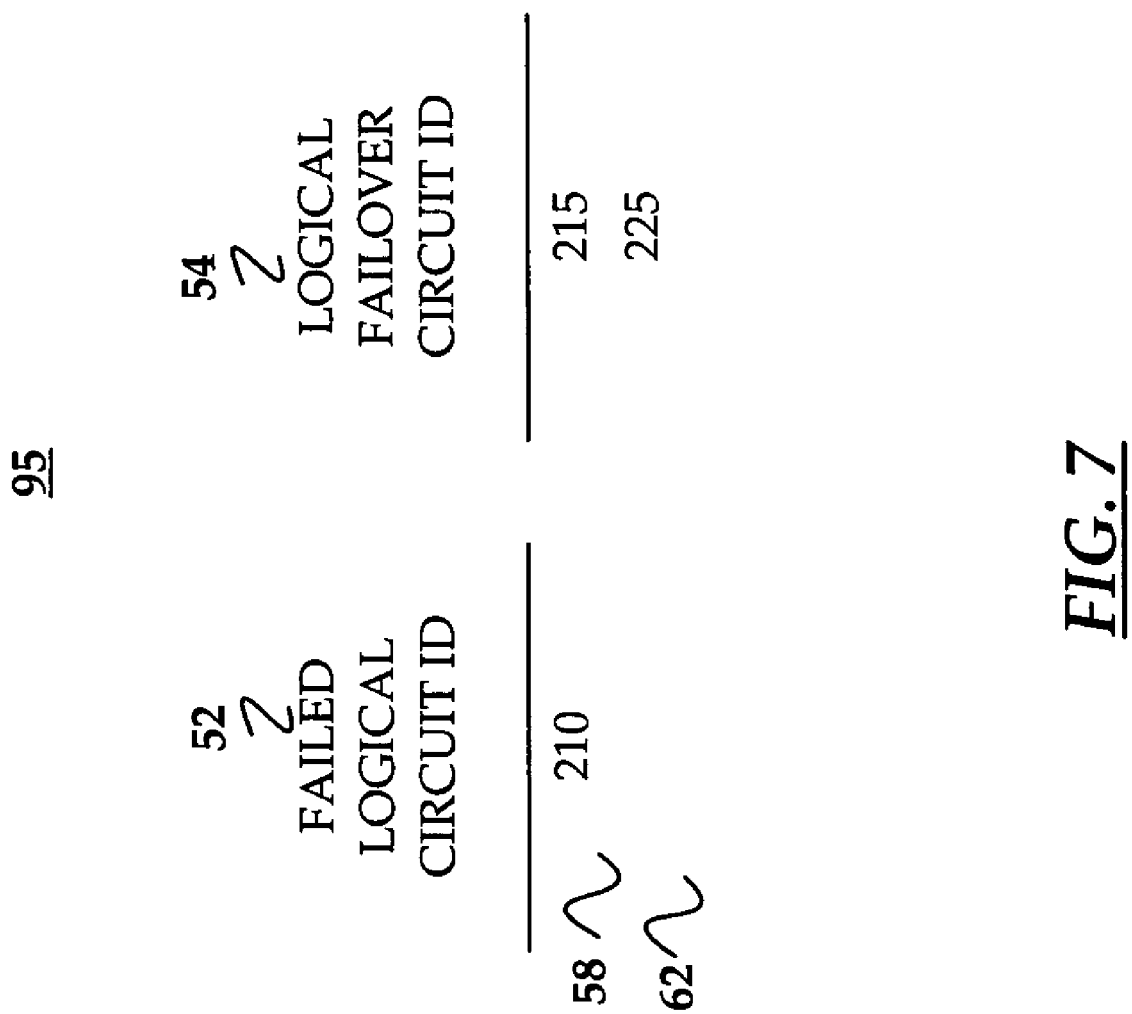
FIG. 7 is a table identifying failed logical circuits and a list of available failover circuits for rerouting logical circuit data in the data network of FIG. 1, according to an embodiment of the present invention.

FIG. 7 is a table 95 identifying failed logical circuits and a list of available failover circuits for rerouting logical circuit data, according to an illustrative embodiment of the present invention. The table may be generated by the network management module 176 in response to a user (e.g., a technician) selecting a failed logical circuit from the map 60 (discussed above with respect to FIG. 6). It will be appreciated that, according to one embodiment, the table 95 may be generated in response to the user at the network management module 176 (or the remote access module 178) selecting the failed logical circuit 210 indicated on the map 60 using an input device such as a mouse.

As shown in FIG. 7, the table 95 includes a "failed logical circuit ID" column 52 and a "logical failover circuit ID" column 54. As discussed above with respect to FIG. 1, the failed logical circuit IDs and the logical failover circuit IDs displayed in the table 95 may be DLCIs or VPI/VCIs for identifying logical circuits in the data network 2. The logical circuit ID column 52 identifies a failed logical circuit selected from the map 60 discussed above with respect to FIG. 6. The logical failover circuit ID column 54 shows any currently available logical failover circuits for rerouting data from the failed logical circuit. It will be appreciated that, similar to the map 60 above, the table 95 may include a GUI which allows a user at either the network management module 176 or the remote access module 178, to select a logical failover circuit for rerouting data from a failed logical circuit by clicking on the displayed logical failover circuit ID using an input device such as a mouse.

Figure 8:
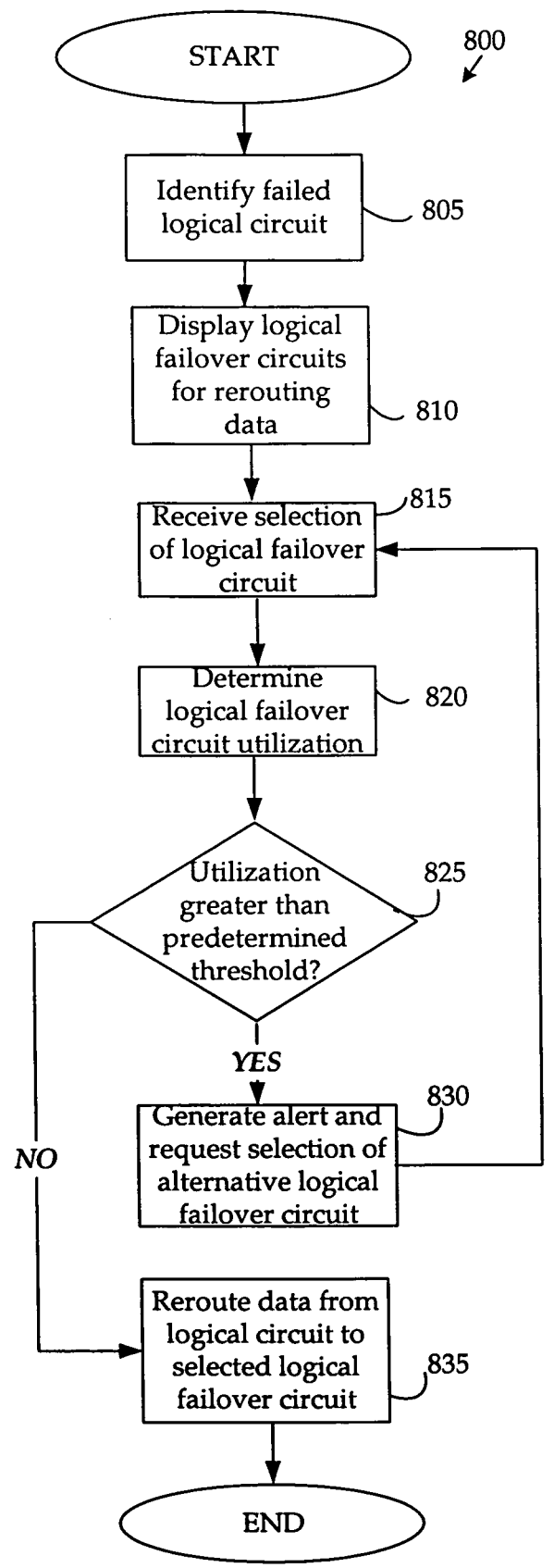
FIG. 8 is a flowchart describing logical operations for on demand selective rerouting of logical circuit data in the data network of FIG. 1, according to an embodiment of the invention.

FIG. 8 illustrates a flowchart describing logical operations 800 for on demand rerouting of logical circuit data in the data network 2 of FIG. 1, according to an embodiment of the invention. It will be appreciated that the logical operations 800 may be initiated when a logical circuit failure is discovered in the data network 2. For example, a customer at the remote device 114 may discover a logical circuit failure by observing that the remote device 114 is dropping frames or cells sent from the host device 116 (e.g., by reviewing LMI status information in the host device). Alternatively, a logical failover circuit may be discovered by a technician accessing the network management module 176 (or a customer accessing the remote access module 178) which may be utilized to display a current status of the logical circuit's in the customer's network as shown in FIG. 6.

The logical operations 800 begin at operation 805 where the network management module 176 identifies a failed logical circuit in the data network 2. It will be appreciated that a logical circuit failure may be based on status information received in communications with the logical element module 153 to request trap data generated by one or more switches in the data network 2. The trap data indicates the status of one or more logical connections making up the logical circuit. An illustrative method detailing the identification of logical circuit failures in a data network is presented in co-pending U.S. patent application Ser. No. 10/745,170, entitled "Method And System For Automatically Identifying A Logical Circuit Failure In A Data Network," filed on Dec. 23, 2003, and assigned to the same assignee as this application, which is expressly incorporated herein by reference.

After receiving the identifying a failed logical circuit at operation 505, the logical operations 800 continue at operation 810 where the network management module 176 (or the remote access module 178 in communication with the network management module 176) displays one or more logical failover circuits for rerouting data from the identified failed logical circuit. It should be understood that the displayed logical failover circuits are identified by the network management 176 from available logical circuits in the data network 2. For example, if as shown in FIG. 6, it is determined that a failure has occurred in the logical circuit 210 between the host device 116 and the remote device 114, logical failover circuits 215 and 225 in communication with the failover network 17 may be identified for rerouting data such that it bypasses the failed logical circuit 210.

It should be understood that the network management module 176 may identify a logical failover circuit by identifying a logical connection or NNI in the overbalanced logical circuit. Information related to each logical connection in a logical circuit may be stored in the database 170 (shown in FIG. 3) including the first and second ends of the logical circuit to which the logical connection belongs. Once the ends of a logical circuit are determined by accessing the database 170, the network management module 176 may select a logical failover circuit having a communication path including the first and second ends of the overbalanced logical circuit for rerouting data.

It will be appreciated that in one embodiment, the logical failover circuit identified may be a dedicated circuit which is only utilized for rerouting logical data from the failed logical circuit (i.e., the failover circuit does not normally communicate data traffic). In another embodiment, the logical failover circuit may be an existing logical circuit which is normally utilized for communicating data traffic in the data network 2. In this embodiment, the identification of the logical failover circuit may also include determining whether one or more logical connections in the logical circuit are currently communicating data traffic or are currently unused. If currently unused, the logical connections may be selected for rerouting logical data. The logical operation 800 then continue from operation 810 to operation 815.

At operation 815, the network management module 176 receives a selection of a displayed logical failover circuit from the menu of logical failover circuits displayed at operation 810. It should be understood that the logical failover circuit may be selected directly from the network management module 176 or alternatively from the remote access module 178. As discussed above in the description of FIG. 7, it will be appreciated that the logical failover circuit may be selected by clicking on a displayed logical failover circuit ID using an input device such as a mouse. The logical operations 800 then continue from operation 815 to operation 820.

At operation 820, the network management module 176 determines the utilization of the logical failover circuit selected at operation 815. As discussed above in the description of FIG. 3, the network management module 176 may be configured to compile historical utilization data for logical circuits based on an analysis of stored trap data. Logical circuits with high utilizations are susceptible to congestion (i.e., dropped frames or cells between network devices). It will be appreciated that the network management module 176 may be configured to generate an alert when the utilization of a selected logical failover circuit exceeds a predetermined threshold to ensure that rerouted logical circuit data is not lost due to congestion. For example, the network management module 176 may be configured to generate an alert for selected logical failover circuits having utilizations which are historically (i.e., on average) greater than 80%. The logical operations 800 then continue from operation 820 to operation 825.

At operation 825, the network management module 176 compares the utilization of the selected logical failover circuit to the predetermined threshold. If the threshold is exceeded, then the logical operations 800 continue to operation 830 where the network management module 176 generates an alert and requests the selection of an alternative logical failover circuit (provided one is available) from the menu or table 95 (as shown in FIG. 7). The alert and subsequent request may be displayed on a display screen at the network management module 176 or the remote access module 178. For example, if the network management module 176 is configured to generate an alert for utilizations greater than 80% and the selected logical failover circuit 215 has a historical utilization of 85%, the network management module 176 may generate an alert such as "The logical failover circuit 215 has a utilization of 85%. Please select an alternative logical failover circuit." The logical operations 825 then return to operation 815 where the network management module 176 receives the selection of the alternative logical failover circuit.

It will be appreciated that in an alternative embodiment, the network management module 176 may be configured to automatically determine the utilizations of all available logical failover circuits after receiving the selection of a logical failover circuit at operation 815. In this embodiment, if it is determined that the selected logical failover circuit exceeds the utilization threshold, then the network management module may generate a new menu of alternative logical failover circuits, all of which have utilizations under the threshold.

If at operation 825 it is determined that the utilization threshold is not exceeded, the logical operations then continue at operation 835 where the network management module 176 initiates rerouting of the failed logical circuit data over the selected logical failover circuit. An illustrative method detailing the rerouting of failed logical circuits in a data network is presented in co-pending U.S. patent application Ser. No. 10/744,921, entitled "Method And System For Automatically Rerouting Logical Circuit Data In A Data Network," filed on Dec. 23, 2003, and assigned to the same assignee as this application, which is expressly incorporated herein by reference. The logical operations 800 then end.

It will be appreciated that the embodiments of the invention described above provide for a method and system for on demand selective rerouting of logical circuit data in a data network. In accordance with the present invention, the above and other problems are solved by a method and system for on demand selective rerouting of logical circuit data in a data network. When a logical circuit failure is detected, a list of alternative or logical failover circuits is generated for rerouting the data from the failed logical circuit. Upon the selection of a logical failover circuit, the data from the failed logical circuit is rerouted to the selected logical failover circuit in the data network. The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

We claim:

1. A method for on demand selective rerouting of logical circuit data in a data network, the method comprising:
   identifying a failed logical circuit in the data network;
   displaying at least one logical failover circuit for rerouting data from the identified failed logical circuit, wherein displaying at least one logical failover circuit for rerouting data from the failed logical circuit comprises generating a menu displaying the at least one logical failover circuit for selection;
   receiving a selection of a logical failover circuit from the displayed at least one logical failover circuit;
   (a) determining whether a utilization of the selected logical failover circuit exceeds a threshold utilization indicative of congestion susceptibility;
   (b) if the utilization is less than the threshold utilization, then rerouting the logical circuit data from the failed logical circuit to the selected logical failover circuit;
   (c) if the utilization exceeds the threshold utilization, then requesting the selection of an alternative logical failover circuit from the menu; and
   rerouting the data from the failed logical circuit to the selected logical failover circuit.

2. The method of claim 1, further comprising:
   repeating the operations (a)–(c) for each logical failover circuit selected from the menu.

3. The method of claim 1, wherein the at least one logical failover circuit comprises a dedicated failover logical connection in a failover data network.

4. The method of claim 3, wherein the dedicated failover logical connection comprises a network-to-network interface.

5. The method of claim 1, wherein the at least one logical failover circuit comprises an existing logical connection in the data network.

6. The method of claim 1, wherein the logical circuit is identified by a logical circuit identifier in the data network.

7. The method of claim 6, wherein the logical circuit identifier is a data link connection identifier (DLCI).

8. The method of claim 6, wherein the logical circuit identifier is a virtual path/virtual circuit identifier (VPI/VCI).

9. The method of claim 1, wherein the logical failover circuit is a permanent virtual circuit.

10. The method of claim 1, wherein the logical failover circuit is a switched virtual circuit.

11. The method of claim 1, wherein the data network is a frame relay network.

12. The method of claim 1, wherein the data network is an asynchronous transfer mode (ATM) network.

13. A system for on demand selective rerouting of logical circuit data in a data network, comprising:
    a network device for communicating status information for a logical circuit in the data network, the logical circuit comprising a communication path for communicating data;
    a logical element module, in communication wit the network device, for receiving the status information for the logical circuit in the data network; and
    a network management module, in communication with the logical element module, for:
    identifying a failure in the logical circuit based on the status information;
    upon identifying the failed logical circuit, generating a menu displaying at least one logical failover circuit for rerouting data from the failed logical circuit;
    receiving a selection of a logical failover circuit displayed in the menu;
    (a) determining whether a utilization of the selected logical failover circuit exceeds a threshold utilization;
    (b) if the utilization is less than the threshold utilization, then rerouting the logical circuit data from the failed logical circuit to the selected logical failover circuit;
    (c) if the utilization exceeds the threshold utilization, then requesting the selection of an alternative logical failover circuit from the menu; and
    rerouting the data from the failed logical circuit to the selected logical failover circuit.

14. The system of claim 13, further comprising a remote access module for sending and receiving commands from the network management module.

15. The system of claim 13, wherein the network management module is operative to:
    repeat the operations (a)–(c) for each logical failover circuit selected from the menu.

16. The system of claim 13, wherein the at least one logical failover circuit comprises a dedicated failover logical connection in a failover data network.

17. The system of claim 16, wherein the dedicated failover logical connection comprises a network-to-network interface.

18. The system of claim 13, wherein the at least one logical failover circuit comprises an existing logical connection in the data network.

19. The system of claim 13, wherein the logical circuit is identified by a logical circuit identifier in the data network.

20. The system of claim 19, wherein the logical circuit identifier is a data link connection identifier (DLCI).

21. The system of claim 19, wherein the logical circuit identifier is a virtual path/virtual circuit identifier (VPI/VCI).

22. The system of claim 13, wherein the logical failover circuit is a permanent virtual circuit.

23. The system of claim 13, wherein the logical failover circuit is a switched virtual circuit.

24. The system of claim 13, wherein the data network is a frame relay network.

25. The system of claim 13, wherein the data network is an asynchronous transfer mode (ATM) network.

26. The system of claim 13, wherein the status information comprises trap data generated by the network device, wherein the trap data indicates the status of at least one logical connection of the logical circuit.

27. In a computer system having a graphical user interface including a display and a user interface selection device, a method of providing and selecting from a menu on the display at least one logical failover circuit for rerouting data from a failed logical circuit in a data network, the method comprising:

displaying a failed logical circuit on a map on the display, the map including a current status of at least one logical circuit in the data network;

receiving a map entry selection signal indicative of the user interface selection device pointing at the map on the display, and, in response to the selection signal, displaying the menu including at least one entry comprising the at least one logical failover circuit for rerouting the data from the displayed failed logical circuit;

receiving an execution signal indicative of a user selecting the menu entry comprising the at least one logical failover circuit;

after receiving an execution signal, determining whether a utilization of the selected logical failover circuit exceeds a threshold utilization;

if the utilization is less than the threshold utilization, then reroute the logical circuit data from the failed logical circuit to the selected logical failover circuit;

if the utilization exceeds the threshold utilization, then request the selection of an alternative logical failover circuit from the menu; and in response to the execution signal, rerouting the data from the failed logical circuit to the selected logical failover circuit.

* * * * *